FLUID AMPLIFIER SERIAL DIGITAL ADDER LOGIC CIRCUIT

Filed March 28, 1966

Inventor:
Robert K. Rose,
by Louis A. Moucha 3,350,009

FLUID AMPLIFIER SERIAL DIGITAL ADDER LOGIC CIRCUIT

Robert K. Rose, Burnt Hills, N.Y., assignor to General Electric Company, a corporation of New York Filed Mar. 28, 1966, Ser. No. 537,907
10 Claims. (Cl. 235—201)

ABSTRACT OF THE DISCLOSURE

A serially-operated fluidic logic circuit for providing binary coded fluid signals representing binary addition computation. The logic circuit comprises first and second half-adder circuits interconnected by a one-bit carry circuit. Each half-adder circuit includes three OR-NOR logic fluid amplifiers and the carry circuit includes a minimum of four fluid amplifiers. Two digital numbers to be added and their corresponding "not" logic components are supplied in pressurized fluid binary bit form to the first half-adder circuit, the total sum and carry being produced at the output of the second half-adder circuit.

The invention described herein was made in the performance of work under a NASA contract and is subject to the provisions of Section 305 of the National Aeronautics and Space Act of 1958, Public Law 85–568 (72 Stat. 435; 42 U.S.C. 2457).

My invention relates to a fluid-operated logic circuit employing devices having no mechanical moving parts and known as fluid amplifiers, and in particular, to such logic circuit which provides the function of a serial digital adder.

Fluid-operated logic circuits employing the recently developed no-moving parts devices known as fluid amplifiers have many advantages over the analogous electronic circuits. In particular, the fluid amplifier is relatively simple in design, inexpensive in fabrication, capable of withstanding extreme environmental conditions such as shock, vibration, nuclear radiation and high temperature, and the no-moving parts feature permits substantially unlimited lifetime thereby achieving long periods of uninterrupted operation. This latter feature is of special significance in the computation and control systems field where trouble-free elements are necessary to achieve such desired uninterrupted operation.

The computation and control systems fields employ digital computation, analog computation or combinations thereof. The use of digital computation has several advantages over analog computation including accuracy and application flexibility. Thus, practically any desired accuracy can be obtained by increasing the number of bits in a number which is expressed in binary logic digital form. Further, digital computers perform the multiplication of independent variables and nonlinear terms much more conveniently and accurately than analog computers.

Digital computation circuits may be either serial or parallel in operation, depending upon the method of handling the binary bits which make up a digital number. Serial addition, although slower since the addition is performed one bit at a time, requires fewer logic elements since the same elements are used for all the bits whereas in parallel addition a separate set of elements is used for each bit. Further, the circuits may be synchronously controlled by a pulse generator conventionally described as a "clock," or, may be asynchronously controlled such that each operation triggers the next. One of the basic circuits employed in digital computation is the digital adder circuit which produces the addition (summation) of two digital numbers. The word "summation" or "sum"

when used herein is limited to the mathematical process of addition, and is not meant to include subtraction.

Therefore, one of the principal objects of my invention is to provide a fluid-operated digital adder logic circuit.

Another object of my invention is to construct the adder logic circuit from elements having no mechanical moving parts and known as fluid amplifiers.

A still further object of my invention is to provide a serial digital adder logic circuit employing a minimum number of different logic types of fluid amplifiers.

Another object of my invention is to construct the adder circuit from two half-adder circuits each employing only one logic type of fluid amplifier.

Briefly stated, my invention is a new fluid-operated logic circuit for providing pressurized fluid output signals which represent an addition computation in binary bit form. The logic circuit includes a first and second half-adder circuit and a one-bit carry circuit. Each half-adder circuit includes three interconnected OR-NOR logic fluid amplifier elements. Two digital numbers to be added are supplied in pressurized fluid binary bit form as the input to the first half-adder circuit which produces partial sum and first carry signals of the same form at the output thereof. The total sum and second carry signals are produced at outputs of the second half-adder circuit having as inputs the partial sum output of the first half-adder and a carry-in signal (any carry resulting from the addition of the immediately preceding binary bits of the two digital numbers). This carry-in signal is obtained by summing the first and second carries produced by the first and second half-adders, respectively, and thence storing this sum in a one-bit storage component of the one-bit carry circuit until the next two binary bits in the serial sequence are available for summation. A minimum of 10 digital-type fluid amplifier elements may be employed in my serial digital adder logic circuit. Numbers of any desired bit capacity may be added, the greater the capacity, the slower being the summing operation.

The features of my invention which I desire to protect herein are pointed out with particularity in the appended claims. The invention, itself, however, both as to its organization and method of operation, together with further objects and advantages thereof, may best be understood by reference to the following description taken in connection with the accompanying drawings, wherein:

Figure 1:
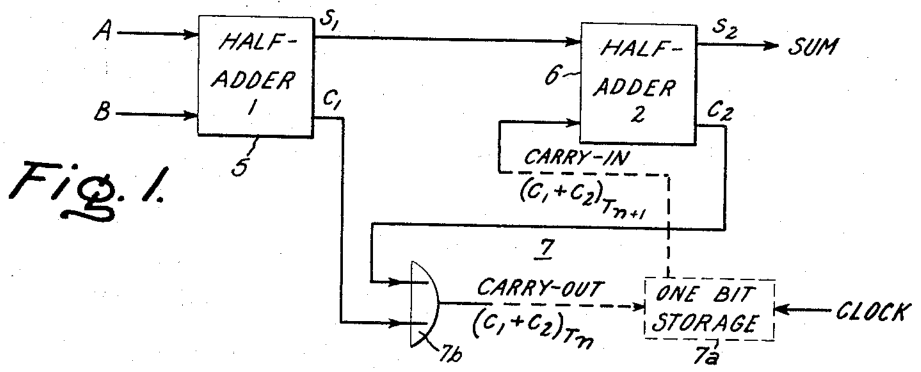
FIGURE 1 is a block diagram of the serial digital adder logic circuit constructed in accordance with my invention.
Figures 2, 3, 4:
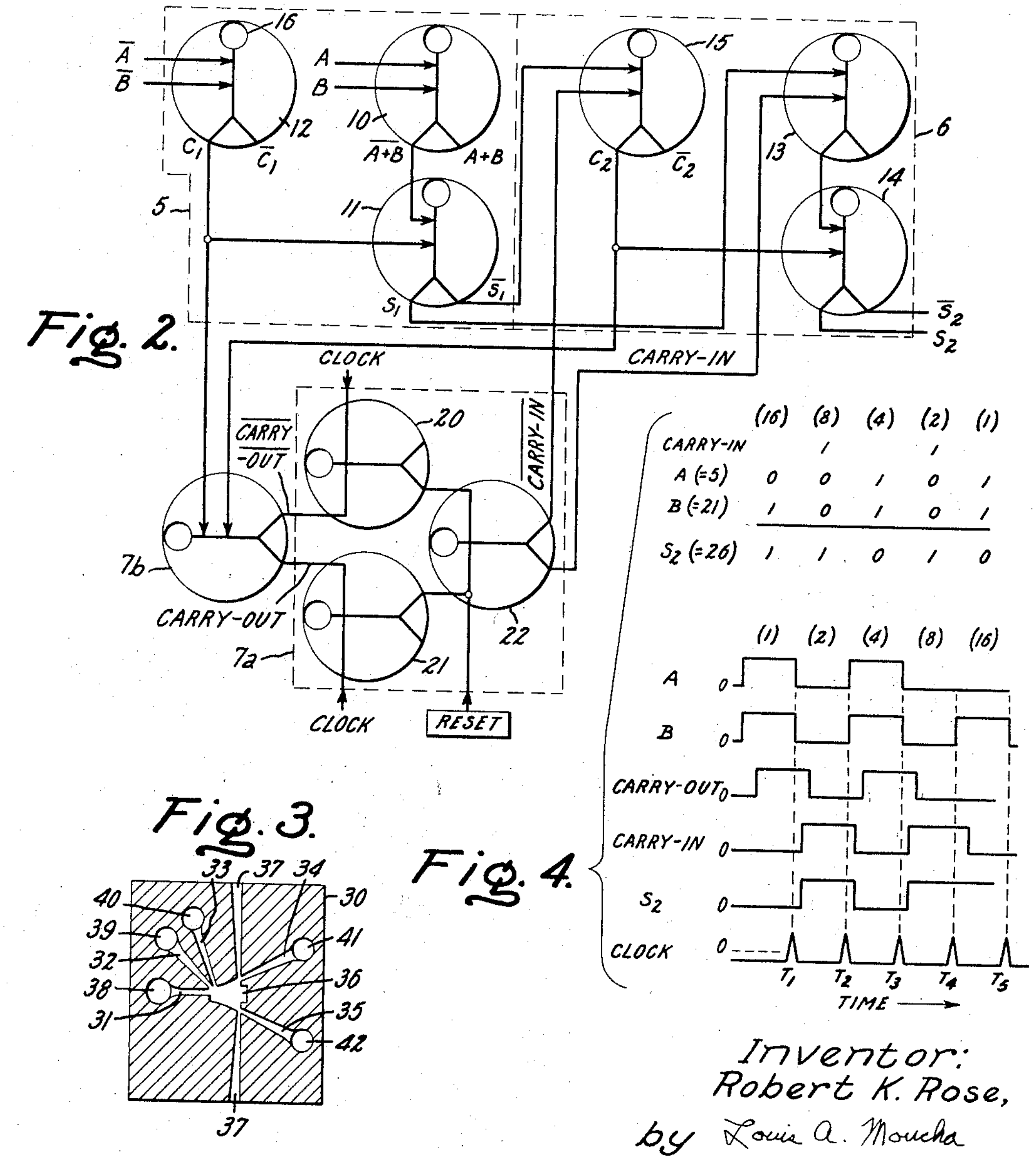
FIGURE 2 is a detailed schematic diagram of the circuit of FIGURE 1.
FIGURE 3 is a diagrammatic view in top plan of the OR-NOR logic fluid amplifier element employed in the half-adder circuits.
FIGURE 4 is a timing diagram of various waveforms useful in explaining the operation of my adder logic circuit.

Referring now to the drawings, in FIGURE 1 there is shown a block diagram of my fluid amplifier serial digital adder logic circuit which includes a first half-adder circuit 5, a second half-adder circuit 6 and a one-bit carry circuit represented as a whole by numeral 7. The fluid interconnections (solid and dashed lines) between these various circuit components are provided with arrowheads to indicate the direction of pressurized fluid signal flow. The specific embodiment of the half-adder circuits as illustrated in FIGURE 2, and the complete adder circuit including one stage of any fluid-operated shift register circuit which is used as a one-bit storage comprise my invention and are hereinafter so claimed. The specific FIGURE 2 embodiment of the shift register stage portion *7a* of the carry circuit 7 is described and claimed in a concurrently filed U.S. patent application S.N. 537,888, Howard W. Avery, inventor, entitled, "Fluid Amplifier Shift Register Circuit," and assigned to the same assignee as the present invention.

The half-adder function may be performed with other types of digital fluid amplifiers such as the passive digital-type AND logic element described and illustrated in FIGURE 4 of U.S. Patent No. 3,232,533 to W. A. Boothe, and assigned to the same assignee as the present invention, and described therein as a half-adder fluid control device of the bistable type. A passive element is defined as one that does not have its own power (fluid) source and thus generally requires additional stages of fluid amplification in order to effectively utilize the output signal.

In many applications it is desirable to minimize the number of different types of fluid amplifier elements for purposes of manufacturing simplification and cost reduction. The serial digital adder logic circuit described herein is a component or basic building block that may be employed in general digital computers since addition is a fundamental mathematical operation, and in negative feedback control systems when used with a complementer, since the adder circuit can compare the system output and input signals. In a particular digital computation circuit application of half-adders and adders, such as in a digital integrator, the digital-type fluid amplifier elements known as the flip-flop, digital amplifier, and OR-NOR logic element are employed throughout the remainder of the integrator circuit. Thus, to minimize the number of different types of fluid amplifier elements used in circuits such as the digital integrator, the half-adder circuits of my present invention are constructed from only OR-NOR logic elements. By such means, the different types of fluid amplifier elements used throughout the digital integrator is limited to three. The use of this minimum number of different type fluid amplifier elements permits all the elements to be operated at a common power (fluid) supply pressure thereby permitting use of modular design and its simplified packaging of the entire circuit.

The operation of my serial digital adder logic circuit will now be described briefly with reference to the block diagram of FIGURE 1 and the timing diagram of FIGURE 4, and will be described subsequently in greater detail with reference to FIGURE 2. The inputs to the adder circuit are designated as A and B, representing two digital numbers to be added, in pressurized fluid binary bit form. In the FIGURE 4 example, A=5 and is represented in five bit capacity binary logic as 00101, and B=21 and in binary form is 10101. The outputs of the first half-adder circuit 5 are a partial sum $S_1$ and a first carry $C_1$ (substantially square waveform, pressurized fluid) signals. The inputs to the second half-adder circuit 6 are the partial sum output $S_1$ of half-adder circuit 5 and a CARRY-IN signal resulting from the immediately preceding series bit addition which was stored in carry circuit 7. The outputs of half-adder circuit 6 are the desired sum $S_2$ of A and B, and a second carry $C_2$. The carries $C_1$ and $C_2$ are summed in an OR-NOR logic element **7*b* to form a CARRY-OUT signal, $(C_1+C_2)T_n$. Since the addition process in my adder circuit is serial, the CARRY-OUT signal must be stored until the next bits of A and B are available. This storage is accomplished by supplying the CARRY-OUT signal to the input of a single shift register stage 7*a* used as a one-bit storage circuit which passes (shifts) the CARRY-OUT signal to an input of half-adder circuit 6** one clock (shift) pulse later, that is, at time $T_{n+1}$. The sequence of the pressurized fluid pulses representing A, B, CARRY-OUT, CARRY-IN, $S_2$ and the synchronous clock are clearly illustrated in the timing diagram of FIGURE 4.

Each half-adder circuit 5 and 6 is comprised of three interconnected OR-NOR logic fluid amplifier elements of the type illustrated in FIGURE 3. The OR-NOR logic elements of FIGURE 3 is a monostable digital-type fluid amplifier of the active type, that is, having a pressurized supply of power fluid and thus does not, in general, require additional amplification of the output signal. A detailed description of this OR-NOR element is given in the aforementioned U.S. Patent 3,232,533, in particular with reference to FIGURE 2 therein. It will suffice herein to summarize the description of the OR-NOR element with reference to FIGURE 3 as follows: The OR-NOR element includes a power fluid inlet 31 and first and second control fluid inlets 32 and 33, each terminating in a restrictor for respectively forming a pressurized continuous power fluid jet and pressurized intermittent control fluid jets directed against the same side of the power jet. The OR-NOR device is monostable in operation in that, if neither control fluid inlet 32 NOR 33 are supplied with pressurized control fluid, the power jet is directed to be normally received within a first receiver (output flow passage 34) downstream of the power fluid inlet. A second output passage 35 is provided for receiving the flow of power fluid from the power jet only during the deflection thereof by a control jet from either control fluid inlet 32 OR inlet 33 or both. The OR-NOR logic element of FIGURE 3, although not necessarily of the conventionally described "boundary layer effect" type, is a digital-type fluid control device in that it provides mutually exclusive pressurized fluid outputs having a substantially square waveform. Indentation 36, provided intermediate the first and second output passages imparts a vortex action to the power jet to enhance the deflection thereof and to compact the fluid therein to aid in creating the substantially exclusive flows of power fluid in the selected one of the output passages 34 and 35. Vents 37 serve to provide passages for removing excess fluid from the region of deflection of the power jet. The fluid connections to the OR-NOR device and interconnections within the adder and half-adder circuits may be accomplished by any of a number of means such as the indicated vertical conduits 38–42 or by the provision of appropriate fluid passages to the other fluid amplifier devices which may be formed within the same base member 30 to thereby minimize the number of external fluid couplings and external connections in the adder circuit.

Referring now to the schematic diagram of FIGURE 2, the first half-adder 5 is comprised of OR-NOR elements 10, 11 and 12 whereas the second half-adder 6 is comprised of OR-NOR elements 13, 14 and 15. The power fluid inlets (represented by the small circles 16) for each of the fluid amplifier elements illustrated in FIGURE 2, may be supplied from a common source of pressurized fluid. The arrowheads within each of the larger circles outlining the schematic symbol of an OR-NOR element represent the control fluid inlets and also indicate the direction of such signal flow. The short legs of the Y within each of the circular schematic symbols of a fluid amplifier element represent the output passages thereof.

The particular interconnection of the three OR-NOR elements 10, 11 and 12 in the first half-adder circuit 5 is determined from the logic equations for the partial sum $S_1$ and first carry $C_1$ in OR-NOR logic form. From the truth table for this first half-adder circuit, the Boolean equations are:

$$S_1=A\bar{B}+\bar{A}B \quad (1)$$

$$C_1=AB \quad (2)$$

where:

$A\bar{B}$ is a conventional logic designation for "A and not B" while the plus (+) sign represents the word "or." Equations 1 and 2 employ both AND and OR-NOR logic. Since it is desired to employ a minimum number of different types of fluid amplifier elements in my adder circuit, and since the particular OR-NOR logic fluid amplifier hereinbefore described is of the active type thereby providing amplification as opposed to the passive AND logic fluid amplifier, my invention is directed to providing half-adder circuits which employ only OR-NOR logic fluid elements.

Equations 1 and 2 can be described in pure OR-NOR logic as follows:

$$\bar{S}_1=\overline{A+B}+\overline{\bar{A}+\bar{B}} \qquad (3)$$

$$\bar{C}_1=\bar{A}+\bar{B} \qquad (4)$$

$$S_1=\overline{\overline{A+B}+\overline{\bar{A}+\bar{B}}} \qquad (5)$$

$$C_1=\overline{\bar{A}+\bar{B}} \qquad (6)$$

Equations 3–6 are implemented by employing the OR-NOR fluid amplifier elements 10, 11 and 12 with the interconnections illustrated in FIGURE 2. Thus, a high pressure state, that is, the presence of pressurized fluid signal square wave pulses supplied to the control fluid inlets of OR-NOR element 10 represents the binary bits of digital numbers A and B conventionally known as binary "ONE." In like manner, the low pressure state, that is, absence of pulses thereat represent binary "ZERO." The corresponding "not" signals A and B (indicated as barred $\bar{A}$ and $\bar{B}$), which are in general available from the source generating signals A and B are supplied to the control fluid inlets of OR-NOR element 12. If these "not" signals are not available they may be generated by passing the single-sides signals A and B through an OR-NOR element. Equations 4 and 6 are implemented by OR-NOR element 12 and Equations 3 and 5 are implemented by the combination of all three elements 10, 11 and 12 as indicated by the interconnections (solid lines interconnecting outputs to control fluid inlets) within the dashed lines enclosing half-adder circuit 5. In similar fashion, the second half-adder circuit 6 is interconnected such that the second carry signals $C_2$ and $\bar{C}_2$ are provided at the output of OR-NOR element 15, and the combination of the three interconnected elements 13, 14 and 15 provide the desired summation of digital numbers A and B as pressurized fluid signals $S_2$ and $\bar{S}_2$ at the outputs of element 14. The equations for the second half-adder circuit are easily developed with reference to the first half-adder. Thus, for example, the sum $S_2$ and carry $C_2$ equations in pure OR-NOR logic are:

$$S_2=\overline{\overline{S_1+CARRY\text{-}IN}+\overline{\bar{S}_1+\overline{CARRY\text{-}IN}}} \qquad (7)$$

$$C_2=\overline{\bar{S}_1+\overline{CARRY\text{-}IN}} \qquad (8)$$

It is apparent from Equation 7 that the desired total addition $S_2$ includes the effect of partial sum $S_1$ and any carries (CARRY-IN) resulting from the immediately preceding serial binary bit addition of the two digital numbers A and B. As mentioned hereinabove, the first and second carry signals $C_1$ and $C_2$ from each serial addition are summed in OR-NOR logic element *7b*, which is of the same type as elements 10–15, to form a pressurized fluid signal herein designated CARRY-OUT or $(C_1+C_2)T_n$. It is to be understood that element *7b* does not provide an actual summation of signals $C_1$ and $C_2$ since the output of element *7b* is the same whether one or both of these signals are present, and thus element *7b* is more in the nature of carry-signal combining means. The carry circuit 7 also includes a one-bit storage circuit *7a* which is a single shift register stage. Thus, any carries $C_1$, $C_2$ which are generated in the half-adder circuits are summed (combined) in OR-NOR element *7b* and thence stored within the one-bit storage circuit *7a* for the time interval between successive clock (shift) pulses until the next binary bits of the numbers A and B are made available at the inputs to the first half-adder circuit 5. At the conclusion of the storage interval, that is, one clock pulse later, the carry signal, now designated CARRY-IN or $(C_1+C_2)T_{n+1}$, is supplied as an input to the second half-adder circuit 6. Synchronization of information throughout the adder circuit is maintained from a pressurized fluid source (not shown) of periodic clock (shift) pulses herein designated CLOCK. The frequency of the clock pulses divided by the number of bits in a word (number) is equal to the number of additions that are performed in one second by the adder circuit. Thus, employing the illustrated example in FIGURE 4 of 5-bit words and a clock (fluid pulse generator) operating a 100 cycles per second, 20 additions per second are performed. It should be apparent that numbers of any bit capacity may be added in my adder circuit, the greater the bit capacity, the slower the summing operation.

The operation of the complete adder circuit will now be more fully described with reference to FIGURE 4 wherein the numbers $A=5$ and $B=21$ in binary bit form are serially added. The binary logic representation of the numbers A and B and their sum $S_2$ and the carry (CARRY-IN) produced in the serial addition of the binary bits are indicated in the table portion of FIGURE 4. A timing diagram of various waveforms in the adder circuit is also illustrated in FIGURE 4 wherein "time" and "fluid pressure" are measured along the abscissa and ordinate, respectively. Prior to $T_1$ (the first clock pulse) the addition of the two binary "ONES" comprising the first bits of A and B produces a binary "ZERO" output at $S_2$ and a "ONE" carry, CARRY-OUT. Application of clock pulse $T_1$ passes the carry forward through the one-bit storage *7a* to the CARRY-IN position (after a short time delay) where it is added with the two binary "ZEROES" comprising the second bits of A and B to produce a binary "ONE" output as $S_2$ and a "ZERO" CARRY-OUT (after a short time delay). The remainder of the addition operation proceeds from clock pulses $T_2$ through $T_5$ are is clearly shown in the timing diagram.

As hereinabove described, the signal at the input to the one-bit storage circuit *7a* becomes the CARRY-IN signal at the output of such storage circuit one clock (shift) pulse later in time. The one-bit storage circuit *7a* may comprise any single shift register stage and for illustrative purposes is illustrated in FIGURE 2 as a single stage of a shift register circuit described and claimed in the hereinbefore mentioned U.S. patent application. Circuit *7a* may be briefly described as comprising two digital-type fluid amplifier elements 20, 21 which are digital amplifiers and a third digital-type fluid amplifier element 22 which is a flip-flop. The major distinction between a digital amplifier and flip-flop is that the digital amplifier has no memory in that the power fluid jet does not remain attached to either side wall of the interaction chamber in the absence of a bias or input signal. The flip-flop does have memory (i.e., is bistable) but has a lower gain than the digital amplifier.

In the particular circuit *7a* in FIGURE 2, digital amplifiers 20, 21 are biased by means of a reduced pressure, in the absence of a clock (shift) pulse T, as indicated by the off-zero setting in the clock pulse waveform of FIGURE 4. Thus, in the absence of a clock pulse, the outputs of digital amplifiers 20, 21 remain vented to the atmosphere regardless of any carry signal at the input thereto. However, upon application of a clock pulse, the appropriate carry signals (a CARRY-OUT binary "ONE" or a (not) $\overline{\text{CARRY-OUT}}$ binary "ONE") is passed (shifted) to the input of flip-flop 22 and stored therein until application of the next clock pulse. A source of controlled pressurized fluid pulses, herein designated "RESET," supplies a fluid pulse at the conclusion of the addition of A and B to assure a "ZERO" CARRY-IN state is present prior to the application of the next two numbers to be added. In certain applications such as the aforementioned digital integrator which includes a shift register circuit, the presence of a binary bit after the last clock pulse is used to detect shift register overflow.

It is apparent from the foregoing that my invention attains the objectives set forth. In particular, my invention provides a fluid-operated serial digital adder logic circuit which is constructed from the elements known as fluid amplifiers having no mechanical moving parts. The complete adder circuit is comprised of two half-adder circuits wherein each half-adder circuit employs fluid amplifiers of the OR-NOR logic type and a one-bit carry circuit. Thus, my digital adder circuit has the advantage of employing a minimum number of different types of fluid logic elements. In the particular adder circuit illustrated, the number of types of fluid amplifier elements is limited to three and all are of the active type thereby not necessitating additional stages of fluid amplification. An advantage in standardizing on a minimum number of different types of fluid amplifier elements is the simplification in the assembly of the entire adder circuit. Another advantage of my serial adder circuit is that information is generally transmitted in serial form, and thus no additional serial-to-parallel and parallel-to-serial converters are required with my circuit.

Having described a new fluid-operated logic circuit for providing a serial digital adder function, it is believed obvious that modification and variation of my invention is possible in light of the above teachings. Thus, a buffer amplifier of the digital nonmemory type such as elements 20, 21 may be connected between the outputs of element 22 and the inputs to elements 13, 15, when an additional circuit is connected to the output of element 22 as in the case of the aforementioned digital integrator. In such latter case the connections between element 22 and elements 13, 15 are obviously interchanged. It is, therefore, to be understood that changes may be made in the particular embodiment of my invention described which are within the full intended scope of the invention as defined by the following claims.

What I claim as new and desire to secure by Letters Patent of the United States is:

1. In a fluid-operated logic circuit for providing a serial digital adder function and having no mechanical moving parts, a first fluid amplifier half-adder circuit provided with four control fluid inlets supplied from four separate binary logic inputs, a second fluid amplifier half-adder circuit connected to outputs of said first circuit, said first and second half-adder circuits each comprising three interconnected digital-type fluid amplifier devices of the same logic type and having the same interconnections within each half-adder circuit whereby a minimum number of different logic type fluid amplifier devices may be employed in fluid-operated logic circuits such as serial digital adders and the like which include said first and second circuits, and means for further connecting said first and second half-adder circuits and for supplying a carry signal resulting from an immediately preceding serial bit addition to said second half-adder circuit.

2. In the fluid-operated logic circuit set forth in claim 1 where said fluid amplifier devices are each of a monostable active type adapted to provide an OR-NOR logic function.

3. In the fluid-operated logic circuit set forth in claim 1 wherein said fluid amplifier devices each comprise a power fluid inlet for generating a power jet of pressurized fluid, a pair of fluid receivers downstream from said power fluid inlet, and at least two control fluid inlets positioned intermediate said power fluid inlet and said receivers for generating control jets of pressurized fluid at selected intervals of time and directed against a side of the power jet for causing substantially exclusive flow of the power jet into a selected first of said receivers in response to at least one of said control fluid inlets being supplied with a pressurized fluid, and into the second receiver in response to neither control fluid inlet being supplied with pressurized fluid.

4. In the fluid-operated logic circuit set forth in claim 3 wherein said two control fluid inlets are positioned on the same side of the power jet, a first and second fluid amplifier device in said first circuit responsive to pressurized fluid signals in binary bit form representing two digital numbers to be added and their corresponding "not" logic components which are supplied from said four separate binary logic inputs to said four control fluid inlets, a receiver of each of said first and second amplifier devices in communication with control fluid inlets of the third fluid amplifier device in said first circuit, and a control fluid inlet of a first and second fluid amplifier device in said second circuit in communication with the receivers of said third amplifier device in said first circuit, a receiver of each of said first and second amplifier devices in said second circuit in communication with control fluid inlets of the third fluid amplifier device in said second circuit.

5. A fluid-operated serial digital adder logic circuit comprising a first fluid amplifier half-adder circuit comprising three interconnected OR-NOR logic fluid amplifier devices of the active type, input to said first circuit comprising two digital numbers A and B and corresponding "not" logic components $\overline{A}$ and $\overline{B}$ in pressurized fluid serial binary bit form, output of said first circuit being a partial sum of the two numbers and a first carry signal, a second fluid amplifier half-adder circuit comprising three interconnected OR-NOR logic fluid amplifier devices of the active type, input to said second circuit comprising the partial sum output of said first circuit and a carry-in signal, output of said second circuit being the total sum of the two digital numbers and a second carry signal.

means in communication with an output of said first and second half-adder circuits for combining the first and second carry signals to provide a pressurized fluid serial binary bit carry-out signal, and means in communication with the output of said carry signal combining means for storing the carry-out signal for an interval between successive clock pulses which are supplied to said signal storing means to synchronize the serial addition and thence passing the stored signal to the carry-in input of said second half-adder circuit upon application to the input of said first circuit of the next successive bits of the two numbers A and B being added.

6. The fluid-operated serial digital adder logic circuit set forth in claim 5 wherein said carry signal combining means comprises a seventh OR-NOR logic fluid amplifier device, the first and second carry outputs of said first and second half-adder circuits in communication with control fluid inlets of said seventh OR-NOR device.

7. The fluid-operated serial digital adder logic circuit set forth in claim 5 wherein each of said OR-NOR logic fluid amplifier devices comprise a pressurized power fluid inlet, a pair of fluid receivers downstream from said fluid inlet, and two control fluid inlets positioned intermediate said power fluid inlet and said receivers and on the same side thereof, the input numbers A and B in pressurized fluid serial binary bit form being supplied to the two control fluid inlets of a first of said OR-NOR devices in said first circuit, the corresponding "not" numbers $\overline{A}$ and $\overline{B}$ being supplied to the two control fluid inlets of a second of said OR-NOR devices in said first circuit.

the output of said first circuit comprising partial sums $S_1=\overline{\overline{A+B}+\overline{\overline{A}+\overline{B}}}$ and $\overline{S}_1=\overline{A+B}+\overline{\overline{A}+\overline{B}}$ in pressurized fluid serial binary bit form provided at the receivers of a third of said OR-NOR devices in said first circuit, and first carry signals $C_1=\overline{\overline{A}+\overline{B}}$ and $\overline{C}_1=\overline{A}+\overline{B}$ in pressurized fluid serial binary bit form form provided at the receivers of said second OR-NOR device in said first circuit, and a receiver of said first OR-NOR device in said first circuit in communication with a first control fluid inlet of said third OR-NOR device in said first circuit, and a receiver of said second OR-NOR device in said first circuit in communication with a second control fluid inlet of said third OR-NOR device in said first circuit for obtaining the partial sums $S_1$ and $\overline{S}_1$ at the output thereof.

8. The fluid-operated serial digital adder logic circuit set forth in claim 7 wherein a control fluid inlet of a first of said OR-NOR devices in said second circuit is in communication with the partial sum $S_1$ receiver of said third OR-NOR device in said first circuit, a control fluid inlet of a second of said OR-NOR devices in said second circuit in communication with the partial sum $\overline{S}_1$ receiver of said third OR-NOR device in said first circuit, output of a third OR-NOR device in said second circuit providing the total sum signal $S_2$ and $\overline{S}_2$, output of said second OR-NOR device in said second circuit providing a second carry signal $C_2$ to said carry signal combining means and to a first control fluid inlet of said third OR-NOR device in said second circuit, and output of said first OR-NOR device in said second circuit in communication with the second control fluid inlet of said third OR-NOR device in said second circuit.

9. A fluid amplifier half-adder circuit comprising three OR-NOR logic pure fluid amplifier devices of the active type having no mechanical moving parts, first and second of said three fluid amplifier devices provided with four control fluid inlets supplied from four separate binary logic inputs A, B, $\overline{A}$ and $\overline{B}$, and the third of said three fluid amplifier devices interconnected with outputs of said first and second fluid amplifier devices for producing a circuit responsive to the pressurized fluid signals A, B, $\overline{A}$ and $\overline{B}$ in serial binary bit form to provide partial sum $S_1=\overline{\overline{A+B}+\overline{\overline{A}+\overline{B}}}$ and $\overline{S}_1=\overline{A+B}+\overline{\overline{A}+\overline{B}}$ and carry $C_1=\overline{\overline{A}+\overline{B}}$ and $\overline{C}_1=\overline{A}+\overline{B}$ pressurized fluid binary bit signals at the output thereof.

10. The fluid amplifier half-adder circuit set forth in claim 11 wherein each of said fluid amplifier devices comprise a power fluid inlet for generating a power jet of pressurized fluid, a pair of fluid receivers downstream from said power fluid inlet, and a pair of control fluid inlets positioned intermediate said power fluid inlet and said receivers and on the same side of the power jet for generating control jets of pressurized fluid against the side of the power jet at selected intervals of time to cause substantially exclusive flow of the power jet into a selected first of said receivers in response to at least one of said control fluid inlets being supplied with pressurized fluid and into the second receiver in response to neither control fluid inlet being supplied therewith, a first of said three devices responsive to the pressurized fluid signals representing the two digital numbers A and B which are supplied to the control fluid inlets therefore providing the sums A+B and $\overline{A+B}$ in OR-NOR logic at the receivers thereof, a second of said three devices responsive to pressurized fluid signals representing the two digital numbers $\overline{A}$ and $\overline{B}$ which are supplied to the control fluid inlets thereof for providing the carry signals $C_1=\overline{\overline{A}+\overline{B}}$ and $\overline{C}_1=\overline{A}+\overline{B}$ at the receivers thereof.

the $\overline{A+B}$ output receiver of said first device in communication with a first control fluid inlet of said third device, and the $C_1$ output receiver of said second device in communication with a second control fluid inlet of said third device for providing the partial sum signals $S_1=\overline{\overline{A+B}+\overline{\overline{A}+\overline{B}}}$ and $\overline{S}_1=\overline{A+B}+\overline{\overline{A}+\overline{B}}$ at the receivers of said third device.

References Cited

UNITED STATES PATENTS

| | | | |
|---|---|---|---|
| 3,128,040 | 4/1964 | Norwood | 235—61 |
| 3,190,554 | 6/1965 | Gehring, et al. | 235—201 |
| 3,232,533 | 2/1966 | Boothe | 235—200 |
| 3,286,086 | 11/1966 | Bauer | 235—201 |

OTHER REFERENCES

Glattli: IBM Technical Disclosure Bulletin, vol. 6, No. 2, July 1963, p. 29.

RICHARD B. WILKINSON, *Primary Examiner.*

L. R. FRANKLIN, *Assistant Examiner.*

UNITED STATES PATENT OFFICE

CERTIFICATE OF CORRECTION

Patent No. 3,350,009 October 31, 1967

Robert K. Rose

It is hereby certified that error appears in the above numbered patent requiring correction and that the said Letters Patent should read as corrected below.

Column 9, line 7, strike out "form"; column 10, line 2, for the claim reference numeral "11" read -- 9 --.

Signed and sealed this 19th day of November 1968.

(SEAL)
Attest:

Edward M. Fletcher, Jr.
Attesting Officer

EDWARD J. BRENNER
Commissioner of Patents